UNITED STATES PATENT OFFICE.

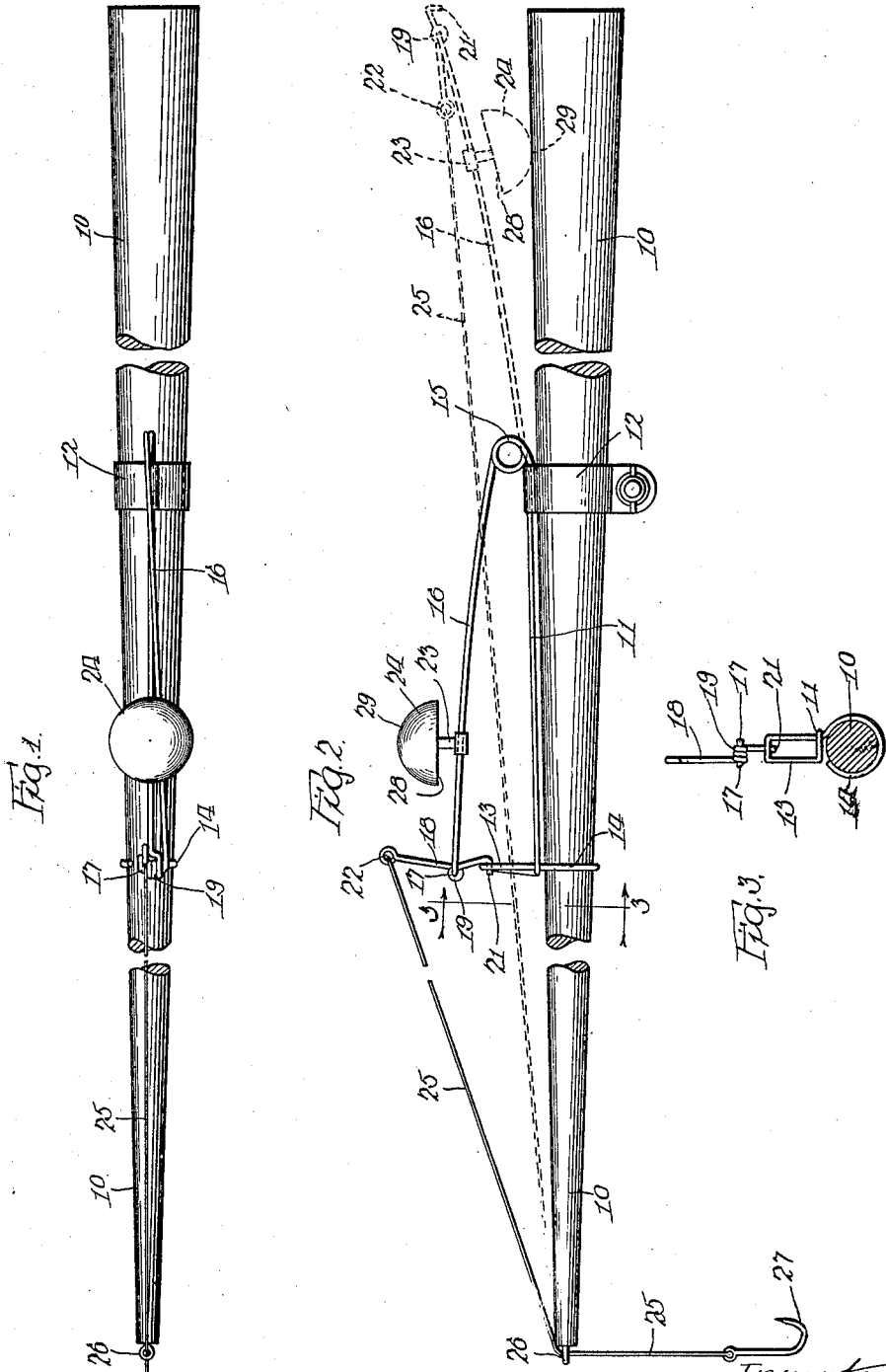

HERMAN E. WEHNER AND FRANK J. HELLER, OF CHICAGO, ILLINOIS.

FISHING DEVICE.

1,317,843.    Specification of Letters Patent.    Patented Oct. 7, 1919.

Application filed May 5, 1919. Serial No. 294,941.

*To all whom it may concern:*

Be it known that we, HERMAN E. WEHNER and FRANK J. HELLER, citizens of the United States, residing at Chicago, in the county of Cook and State of Illinois, have invented certain new and useful Improvements in Fishing Devices, of which the following is a specification.

This invention relates to fishing devices and has for its primary object the provision of an improved device of this character which shall have improved means for signaling the presence of a fish on the fishing tackle attached to the device. Another object is the provision of an improved construction for fishing devices of this type whereby a very positive signal is given and whereby an extremely simple and cheap form of bell may be employed. Another object is the provision of a fishing device comprising very few parts simple in operation and economical to manufacture.

Other objects and advantages of the present invention will appear from the following description, taken in conjunction with the accompanying drawings which illustrate the preferred embodiment of the invention and form a part of this specification.

In the drawings:

Figure 1 is a top plan view of the invention showing it attached to a fishing rod in set position.

Fig. 2 is a side elevation of the rod and invention shown in Fig. 1 showing the device in sprung position in dotted lines.

Fig. 3 is a fragmentary section taken on line 3—3 of Fig. 2 and looking in the direction indicated by the arrows.

Reference numeral 10 indicates the tip of the fishing rod. While the present invention is attachable to a boat or the floor of a pier, it is here shown in the preferable embodiment adapted for attachment to a fishing pole. A piece of spring wire 11 parallels the surface of the pole and is attached to the pole by means of any suitable clamp 12. From clamp 12 the wire extends forwardly a considerable distance and at its forward end is bent to form a stationary trigger loop 13 upstanding from the pole. From the loop 13 the wire passes downwardly and its extremity is bent about the pole to form a retaining ring 14. Just behind the clamp 12 the wire 11 is helically coiled to form a spring 15, the wire extending forwardly from the spring coil forming a spring arm 16. The forward extremity of the spring arm 16 is bent to form a substantially horizontal axle 17 positioned at such a distance from the spring 15 as to stand directly above the trigger loop 13 in the set position of the device. A single piece of wire generally indicated by numeral 18 is looped as at 19 to form a bearing loosely journaled upon the axle 17. The wire 18 depends from the loop 19 a short distance and is bent forwardly at its lower end to form a trigger 21. From the loop 19 the wire 18 extends upwardly and is formed at its upper extremity into an eyelet 22. Secured to the spring arm 16 preferably forward of its middle, but sufficiently removed from its forward end to permit free play of the wire 18, is fixed a bracket 23 carrying a bell 24 rigidly fixed upon the bracket. In the set position of the device the bell 24 has its convexity uppermost. The fish-line 25 is attached by its rear end to the eyelet 22 on the wire 18, passes forwardly therefrom through the line guide 26 at the forward end of the pole 10 and on its outer end carries the usual fishing hook 27. The resiliency of the spring 15 is such that the spring arm 16 is normally thrown to the dotted line position shown in Fig. 2 where it is very nearly in alinement with that portion of the wire 11 which is integral with the spring arm and parallels the surface of the pole. Except for the presence of the bracket 23 and bell 24, the latter striking the pole, the spring arm 16 would strike the surface of the pole rearwardly of the clamp 12. In setting the device the spring arm 16 is bent forwardly and downwardly to position its axle 17 above the trigger loop 13, whereupon the trigger 21 is caught upon the loop 13 as best seen in Figs. 2 and 3. With the device in this position the spring arm is locked in tensed condition, the wire 18 upstanding from the axle 17. When the fish bites the hook 27, causing a jerk thereon, a forward movement of the fishing line 25 rotates the loop 19 on the axle 17 tripping the trigger 21 from its loop 13 and releasing the spring arm to the action of the heavy coiled spring 15. The spring 15 now acts to jerk the line 25 violently inboard setting the hook 27 firmly in the fish's mouth. At the same time the backward throw of the arm 16 causes the bell 24 to strike violently against the pole 10 giving out a very positive signal. It is to be noted that the convex outer surface of the bell 24 strikes the pole thereby preventing undue damage to the latter. It is also noted that the bell 24 strikes the pole at a point remote from its vibrating edge 28 but also slightly removed from its apex or point of juncture with the bracket 23. The point on the bell which contacts with the pole in the normal or released position of the device is approximately indicated at 29 in Fig. 2. Were the bell to strike exactly at its point of contact with the bracket 23 there would be little or no vibration of the bell. In order to insure vibration the bell is caused to strike the pole at a point eccentric to its junction with the bracket; no matter how violently the bell was vibrated however it would not ring if its vibrating edge 28 were held in contact with the pole. For this reason the contact point 29 is remote from the vibrating edge. It is to be noted that except for the bracket 23 which carries it, the bell 24 comprises preferably a single piece of metal, this being the cheapest known form of bell. It is further to be noted that the arm 16 passes through an obtuse angle greater than 140°. Two advantages are inherent in this swing of the arm through such a long arc: first the jerking of the line 25 and the hook 27 with violence and through a considerable distance; and secondly the spring 15 is given a long time in which to accelerate the speed of bell 24 from the tripping of the trigger to the contact between the bell and the pole 10 resulting in a very loud and positive ringing of the bell.

While we have illustrated and described the preferred embodiment of our invention, it will be obvious that one skilled in the art may make modifications thereof without departing from the spirit of the invention. Therefore we wish not to be restricted to the precise embodiment shown, except in so far as the same is limited in the appended claims.

We claim:

1. In a fishing device the combination with a clamp, a bell, and a frame element, of two pieces of wire, one of said pieces being secured to the frame element by the clamp, extending forwardly thereof where it is bent to form a trigger loop and a ring for attachment of its forward end to the frame element, said first named wire being of spring metal and helically coiled rearwardly of said clamp and extending from the coil to form a spring arm bent at its free end to define an axle, the second piece of wire being coiled to form a bearing loosely journaled upon said axle, one end of the second wire depending from the free end of the spring arm and being bent to form a trigger adapted to engage said trigger loop, the opposite end of said second wire upstanding from the axle in set position of the device and formed at its upper end for connection with a fishing line, said bell being attached to the spring arm near the free end thereof, and said spring arm having a tendency to describe an arc backwardly from its set position and said bell being so attached to the spring arm as to strike the pole in advance of the arm.

2. In a fishing device the combination with a frame element, and an arm movable toward the same, of a substantially hemispherical bell, a bracket projecting toward the frame element from said arm and rigidly attached to said arm and to the concave side of the bell at the deepest point thereof, said arm and bracket being so arranged with respect to the frame element that in movement of the arm toward the frame element the bell is brought in contact with the frame element at a point on the bell between its vibrating edge and its point of connection with said bracket.

In testimony whereof we affixed our signatures.

HERMAN E. WEHNER.
FRANK J. HELLER.

Copies of this patent may be obtained for five cents each, by addressing the "Commissioner of Patents, Washington, D. C."